(12) United States Patent
Kumar et al.

(10) Patent No.: US 12,664,135 B2
(45) Date of Patent: Jun. 23, 2026

(54) SYSTEM AND METHOD FOR GENERATING HIGH-QUALITY SEISMIC DATA FROM LOW-QUALITY SEISMIC DATA

(71) Applicant: Schlumberger Technology Corporation, Sugar Land, TX (US)

(72) Inventors: Rajiv Kumar, Crawley (GB); Phillip James Bilsby, Crawley (GB); Sunil Manikani, Pune (IN); Sonika, Crawley (GB); Yousif Izzeldin Kamil Amin, Al-Khobar (SA); Massimiliano Vassallo, Crawley (GB); Tao Zhao, Houston, TX (US); Ying Ting Lau, Crawley (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/978,757

(22) Filed: Dec. 12, 2024

(65) Prior Publication Data

US 2025/0190408 A1 Jun. 12, 2025

Related U.S. Application Data

(60) Provisional application No. 63/645,339, filed on May 10, 2024.

(30) Foreign Application Priority Data

Dec. 12, 2023 (IN) .............................. 202311084714

(51) Int. Cl.
*G06F 16/215* (2019.01)
*G06F 16/25* (2019.01)

(52) U.S. Cl.
CPC .......... *G06F 16/215* (2019.01); *G06F 16/258* (2019.01)

(58) Field of Classification Search
CPC .......... G01V 1/364; G01V 1/003; G01V 1/46; G01V 1/50; G01V 2210/32; G06N 20/00; G06N 3/08; G06F 30/27; G06F 18/214
See application file for complete search history.

(56) References Cited

U.S. PATENT DOCUMENTS 11,965,998 B2 * 4/2024 Di .............................. G06N 3/08
2021/0262329 A1 8/2021 Kaur
(Continued)

OTHER PUBLICATIONS

Ma et al., Applications of Machine Learning and Data Mining in SpeedWise® Drilling Analytics: A Case Study, Scoiety of Petroleum Engineers, pp. 1-19, 2018. (Year: 2018).*
(Continued)

*Primary Examiner* — Cheyne D Ly
(74) *Attorney, Agent, or Firm* — Kyle R. Miiller

(57) ABSTRACT

A method for generating high-quality seismic data includes receiving a first dataset. The method also includes selecting a first processing technique based upon the first dataset. The method also includes producing first processed data from the first dataset using the first processing technique. The method also includes selecting a second processing technique based upon the first dataset. The second processing technique is different than the first processing technique. The method also includes producing second processed data from the first dataset using the second processing technique. The method also includes training a machine learning model to transform the first processed data into the second processed data.

20 Claims, 9 Drawing Sheets

(56) References Cited

U.S. PATENT DOCUMENTS

| | | | |
|---|---|---|---|
| 2022/0066060 A1* | 3/2022 | Gillott | G01V 1/375 |
| 2022/0283329 A1 | 9/2022 | Zwartjes | |
| 2023/0086711 A1* | 3/2023 | Vinje | G06N 3/08 |
| | | | 702/14 |
| 2025/0116176 A1* | 4/2025 | Li | E21B 43/16 |
| 2026/0010757 A1* | 1/2026 | Simoes | G06N 3/042 |

OTHER PUBLICATIONS

Candes, E. J. et al., "An Introduction To Compressive Sampling", IEEE Signal Processing Magazine, Mar. 31, 2008, pp. 21-30, vol. 25.
Schonewille, M.A. et al., "Comparison of 3D time-domain radon and matching-pursuit Fourier interpolation", 76th EAGE Conference and Exhibition, Jun. 2014, pp. 1-5, vol. 2014.
Isola, P. et al., "Image-to-Image Translation with Conditional Adversarial Networks", IEEE Conference on Computer Vision and Pattern Recognition (CVPR), 2017, 17 Pages, Honolulu, HI, USA.
Siahkoohi, A. et al., "Seismic Data Reconstruction with Generative Adversarial Networks", 80th EAGE Conference and Exhibition, Jun. 2018, 5 Pages, vol. 2018.
Kaur, H. et al., "Seismic data interpolation using deep learning with generative adversarial networks", Geophysical Prospecting, Feb. 2021, pp. 307-326, vol. 69.

* cited by examiner

SYSTEM 100

MANAGEMENT COMPONENTS 110

SEISMIC DATA 112

OTHER INFORMATION 114

PROCESSING 116

ENTITIES 122

SIMULATION 120

ATTRIBUTE 130

ANALYSIS/ VISUALIZATION 142

OTHER WORKFLOW 144

FRAMEWORK 170

MODULES 175

MODEL SIMULATION 180

FRAMEWORK SERVICES 190

FRAMEWORK CORE 195

DOMAIN OBJECTS 182

DATA SOURCE 184

RENDERING 186

USER INTERFACES 188

160

GEOLOGIC ENVIRONMENT (E.G., SENSING, DRILLING, INJECTING, EXTRACTING, ETC.) 150

1000

158

157

155

152

156

0

159

1000

2000

153-1

153-2

3000

154

4000

151

5000

300

INPUT SUBSURFACE DATA FROM THE FIELD — 301

PERFORM LOW-COST PROCESSING PRODUCING LOW-COST RESULTS — 303

PROVIDE THE LOW-COST RESULTS FROM PREVIOUS STEP THROUGH TRAINED MACHINE LEARNING MODEL PRODUCING QUALITY RESULTS — 305

PROVIDE THE HIGH QUALITY RESULTS TO THE USER — 307

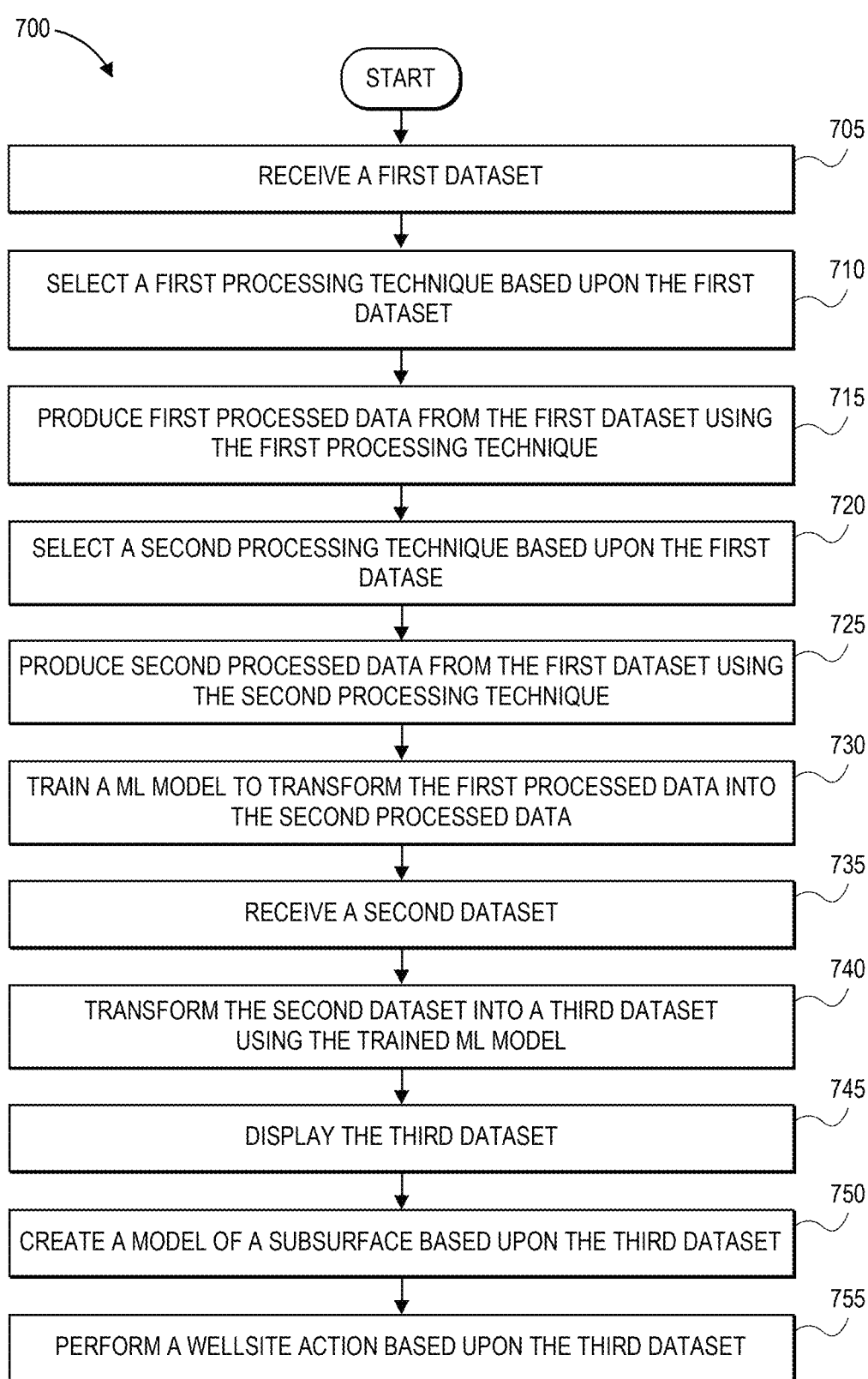

700

START

RECEIVE A FIRST DATASET                                                          705

SELECT A FIRST PROCESSING TECHNIQUE BASED UPON THE FIRST DATASET                  710

PRODUCE FIRST PROCESSED DATA FROM THE FIRST DATASET USING THE FIRST PROCESSING TECHNIQUE    715

SELECT A SECOND PROCESSING TECHNIQUE BASED UPON THE FIRST DATASE                  720

PRODUCE SECOND PROCESSED DATA FROM THE FIRST DATASET USING THE SECOND PROCESSING TECHNIQUE    725

TRAIN A ML MODEL TO TRANSFORM THE FIRST PROCESSED DATA INTO THE SECOND PROCESSED DATA    730

RECEIVE A SECOND DATASET                                                          735

TRANSFORM THE SECOND DATASET INTO A THIRD DATASET USING THE TRAINED ML MODEL     740

DISPLAY THE THIRD DATASET                                                        745

CREATE A MODEL OF A SUBSURFACE BASED UPON THE THIRD DATASET                       750

PERFORM A WELLSITE ACTION BASED UPON THE THIRD DATASET                            755

FIG. 7

SYSTEM AND METHOD FOR GENERATING HIGH-QUALITY SEISMIC DATA FROM LOW-QUALITY SEISMIC DATA

CROSS-REFERENCE TO RELATED APPLICATIONS

This application claims priority to Indian Provisional Patent Application No. 202311084714, filed on Dec. 12, 2023, and U.S. Provisional Patent Application No. 63/645, 339, filed on May 10, 2024, which are incorporated herein by reference.

BACKGROUND

Seismic data processing is divided into multiple stages. The first stage, referred to herein interchangeably as fast-track processing, uses a type of processing that produces approximated images of the subsurface relatively quickly compared to the second stage, referred to herein interchangeably as full-track processing. During the first stage, the issues that the data exhibit are evaluated, and types of processing tools that can be used to optimize signal quality are found. Information from the first stage is used in the second stage to produce more reliable and optimal results compared to results from the first stage. Seismic data processing often involves various steps such as denoising, deblending, interpolation, deconvolution, demultiple, and/or deghosting before data are ready for imaging or inversion. During the first stage, the selection of processing technology depends upon cost and computing time factors, as well as generating the best possible results in a relatively limited time compared to the second stage. The cost factor increases in importance relative to the computing time factor when processing large-scale seismic data volumes to perform subsurface interpretation quickly. Also, the quality of the results from processing depends upon the way seismic data are acquired, for example, how the data are sampled and received in the field.

Cost and computing time factors during the first stage can dictate the choice of a processing technology, sometimes at the expense of quality of the result compared to the quality of the result after second stage processing. How the signal quality that results from processing in the first stage can be improved without increasing the turnaround time has been studied. In particular, a generative adversarial network (GAN) has been used to interpolate seismic data, and compared to the quality of the results from physics-driven deterministic methods. The physics-driven priors can be included in the GAN architecture, but possibly negating the purpose of developing and using a machine learning architecture.

SUMMARY

A method for generating high-quality seismic data is disclosed. The method includes receiving a first dataset. The method also includes selecting a first processing technique based upon the first dataset. The method also includes producing first processed data from the first dataset using the first processing technique. The method also includes selecting a second processing technique based upon the first dataset. The second processing technique is different than the first processing technique. The method also includes producing second processed data from the first dataset using the second processing technique. The method also includes training a machine learning model to transform the first processed data into the second processed data.

A computing system is also disclosed. The computing system includes one or more processors and a memory system including one or more non-transitory computer-readable media storing instructions that, when executed by at least one of the one or more processors, cause the computing system to perform operations. The operations include receiving a first dataset. The first dataset includes seismic data that represents a subsurface. The operations also include selecting a first processing technique based upon the first dataset. The operations also include producing first processed data from the first dataset using the first processing technique. The first processed data has a higher quality than the first dataset. The operations also include selecting a second processing technique based upon the first dataset. The second processing technique is different than the first processing technique. The operations also include producing second processed data from the first dataset using the second processing technique. The second processed data has a higher quality than the first dataset and the first processed data. The operations also include training a machine learning model to transform the first processed data into the second processed data. The operations also include receiving a second dataset. The operations also include transforming the second dataset into a third dataset using the trained machine learning model. The third dataset has a higher quality than the first dataset and the second dataset.

A non-transitory computer-readable medium is also disclosed. The medium stores instructions for autonomously performing a subsurface operation that, when executed by one or more processors of a computing system, cause the computing system to perform operations. The operations include receiving a first dataset. The first dataset includes seismic data that represents a subsurface. The seismic data is from a land or marine environment. The seismic data includes particle data. The particle data includes particle displacement data, particle velocity data, particle acceleration data, or a combination thereof. The operations also include selecting a first processing technique based upon the first dataset. The first processing technique includes denoising, deblending, interpolating, deconvoluting, demultiple, deghosting, imaging, inversion, residual moveout correction (RMO), noise suppression, regularization, or a combination thereof. The operations also include producing first processed data from the first dataset using the first processing technique. The first processed data has a higher quality than the first dataset. The operations also include selecting a second processing technique based upon the first dataset. The second processing technique includes denoising, deblending, interpolating, deconvoluting, demultiple, deghosting, imaging, inversion, RMO, noise suppression, regularization, or a combination thereof. The second processing technique is different than the first processing technique. The operations also include producing second processed data from the first dataset using the second processing technique. The second processed data has a higher quality than the first dataset and the first processed data. The operations also include training a machine learning model to transform the first processed data into the second processed data. The machine learning model includes a generative adversarial network, a variational autoencoder, a diffusion model, a transformer, a neural radiance field, a convolution-based model, a non-convolution-based model, or a combination thereof. Training includes or generates a generator loss function, a discriminator loss function, an adversarial loss function, or a combination thereof. The operations also include receiving a second dataset. The operations also include transforming the second dataset into a third dataset using the trained machine learning model. The third dataset has a higher quality than the first dataset and the second dataset. The operations also include displaying the third dataset.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 7 illustrates a flowchart of a method for computing high-quality seismic data from low-quality seismic data, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
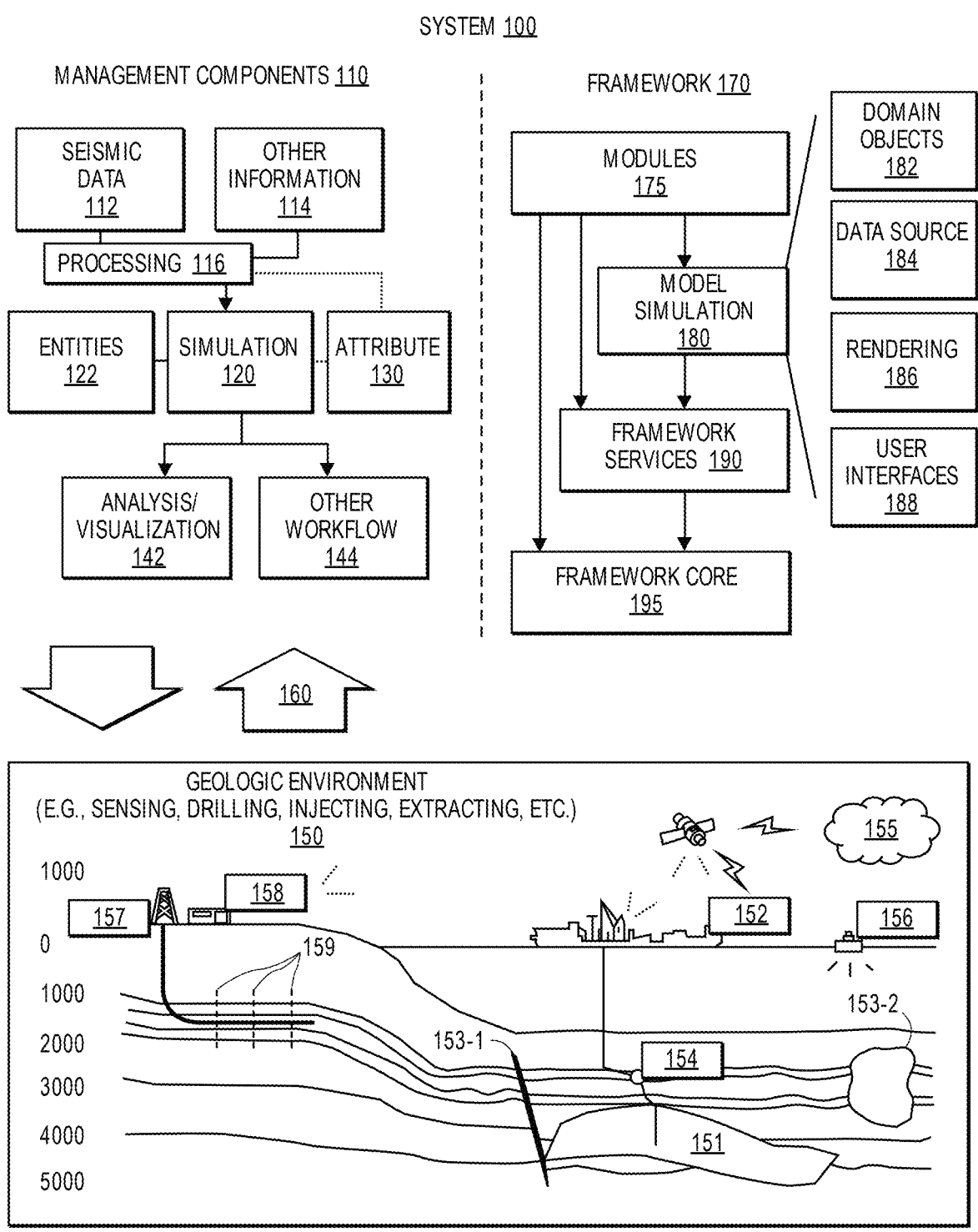
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

System and Method for Generating High-Quality Seismic Data from Low-Quality Seismic Data A method in accordance with the present disclosure includes selecting a sample of seismic data for an area, and subjecting the sample to both fast-track processing techniques and full-track processing techniques. The method further includes training a neural network using the fast-track and full-track processed samples. Once trained, the neural network may produce results that would be obtained from full-track processing based on data provided to the neural network that had undergone fast-track processing. The method still further includes receiving seismic data, providing the data to the trained neural network, obtaining results from the neural network, and providing the results to a user. An example of the type of processing in both fast-track and full-track processing is data interpolation. A fast-track interpolation technique can produce results, for example, but not limited to, images, that exhibit lower resolution and lower quality than a full-track interpolation technique. A neural network, for example, but not limited to, a GAN-based machine learning architecture, can be trained to map the fast-track images to the full-track images. The neural network may be trained using pairs of images created by the fast- and full-track techniques. Collected data may be processed using the fast-track processing technique, for example, fast-track interpolation, and then provided to the neural network to produce images with the same quality and resolution that are achieved when using the full-track techniques, but in the amount of time required for the fast-track processing technique to complete.

In an example, a machine learning-based resolution enhancement method in accordance with embodiments of the present disclosure includes receiving seismic data at an irregular and/or regular grid and extracting a smaller subset of data from the full survey of the seismic data, wherein the seismic data is acquired in a land or marine environment. The method includes, using the subset, generating a pair of datasets from existing seismic processing software where one part of the pair represents low-cost, low-resolution processed data, and the second part of pair represents high-cost, high-resolution data, wherein the above two pairs either come from the same seismic processing technology or from two different processing technologies that solve the same processing problem such as denoising, deblending, interpolating, deconvoluting, demultiple, deghosting, imaging, and/or inversion, and wherein the pair of technologies is differentiated by cost or setup time, which eventually leads to a difference in turnaround time. The method includes training a machine learning model using the pair of datasets, possibly using generator and discriminator and adversarial loss functions, wherein machine learning models can include, but are not limited to including, convolution-based models, or non-convolution based standard models. The method includes, after the machine learning model is trained, creating a low-cost low-resolution solution over the full survey and passing it through the trained model to generate a high-resolution seismic dataset. The seismic data can include particle, velocity, displacement, or acceleration measurements.

Figure 2:
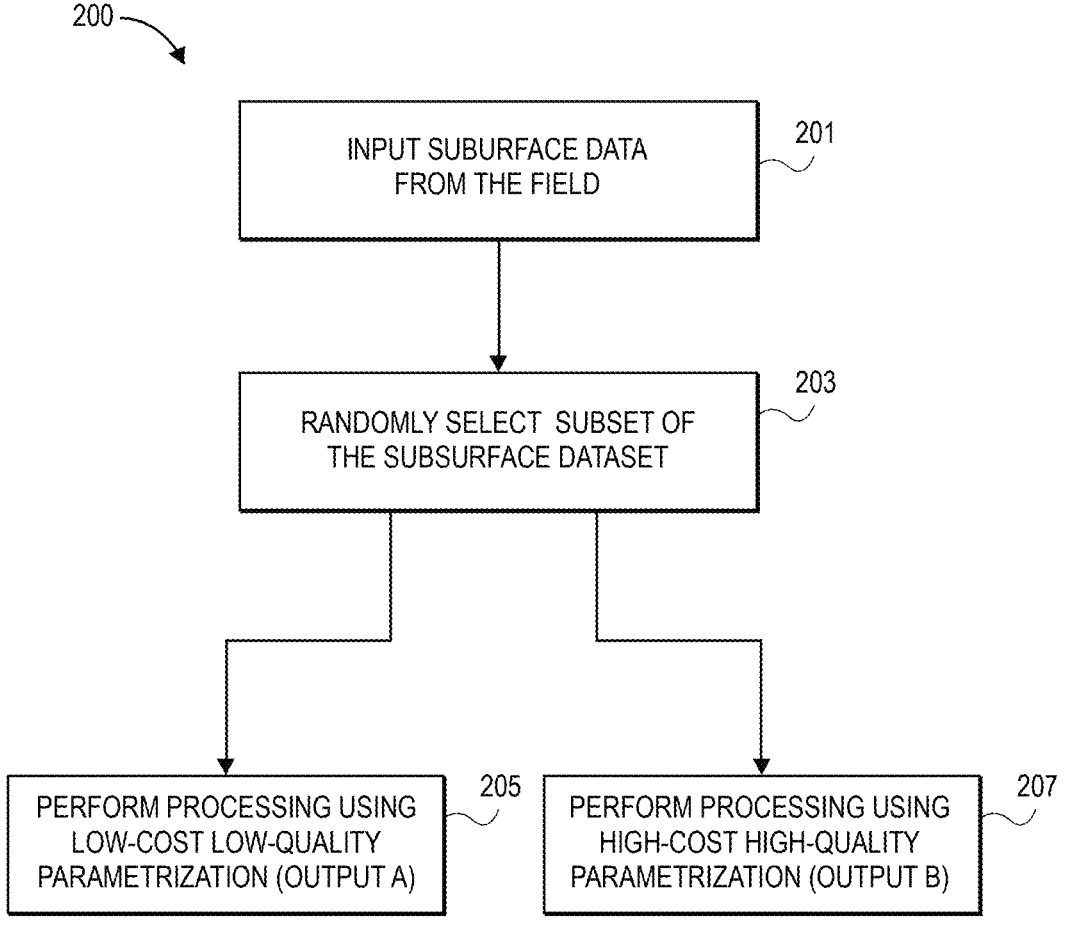
FIG. 2 illustrates a flowchart illustrating a method for training a deep learning network for image-to-image translation for seismic data interpolation, according to an embodiment.

Referring now to FIG. 2, a first aspect of a multi-part process for producing high-quality seismic data includes sampling and processing data in an area of seismic interest. A method 200 for sampling and processing data includes, but is not limited to including, receiving 201 input subsurface data from a field survey, and randomly selecting 203 a subset of the subsurface data. The method 200 further includes processing 205 the subset using a fast-track version of a processing technique, and processing 207 the subset using a full-track version of the processing technique or another technique. The processing technique can include, for example, but not limited to, denoising, deblending, interpolating, deconvoluting, demultiple, deghosting, imaging, and/or inversion. The fast-track version includes a low-cost technique that requires a relatively short amount of time compared to the full-track version, and produces a relatively low resolution result. The full-track version includes a high-cost technique that requires more time to complete than the fast-track version, and produces a higher resolution result than the fast-track version. The relatively low resolution result and the higher resolution result are used to train a machine learning model so that using the low resolution result as input to the machine learning model produces the higher resolution result, but in the relatively short amount of time comparable to using the fast-track version of the processing technique.

Figure 3:
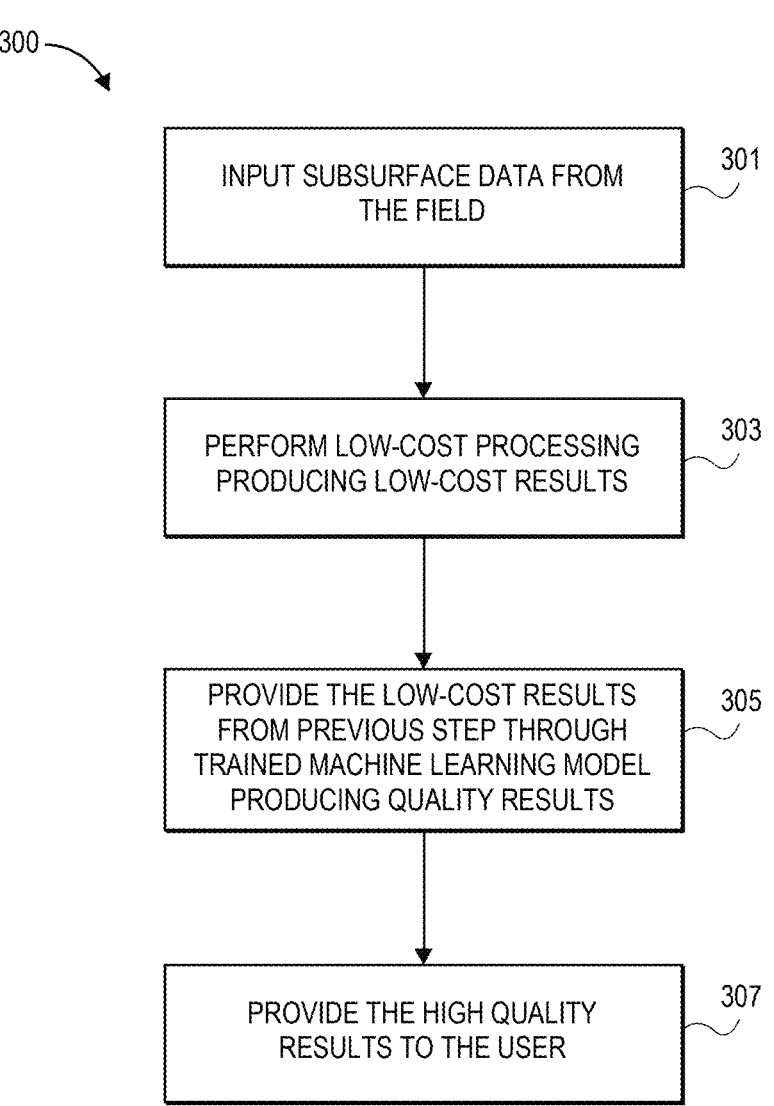
FIG. 3 illustrates a flowchart illustrating a method to train a machine learning model to translate low-cost low-resolution interpolation to high-cost high-resolution interpolation output using machine learning, according to an embodiment.

Referring now to FIG. 3, a method 300 for producing high quality data within a low cost timeframe includes, but is not limited to including, receiving 301 subsurface data from the field, and performing 303 low-cost processing using a fast-track processing technique on the subsurface data to produce low-quality results. The method 300 includes providing 305 the low-quality results to the trained machine learning model to produce high-cost results in a low-cost timeframe, and providing 307 the high-quality results to the user.

Figure 4:
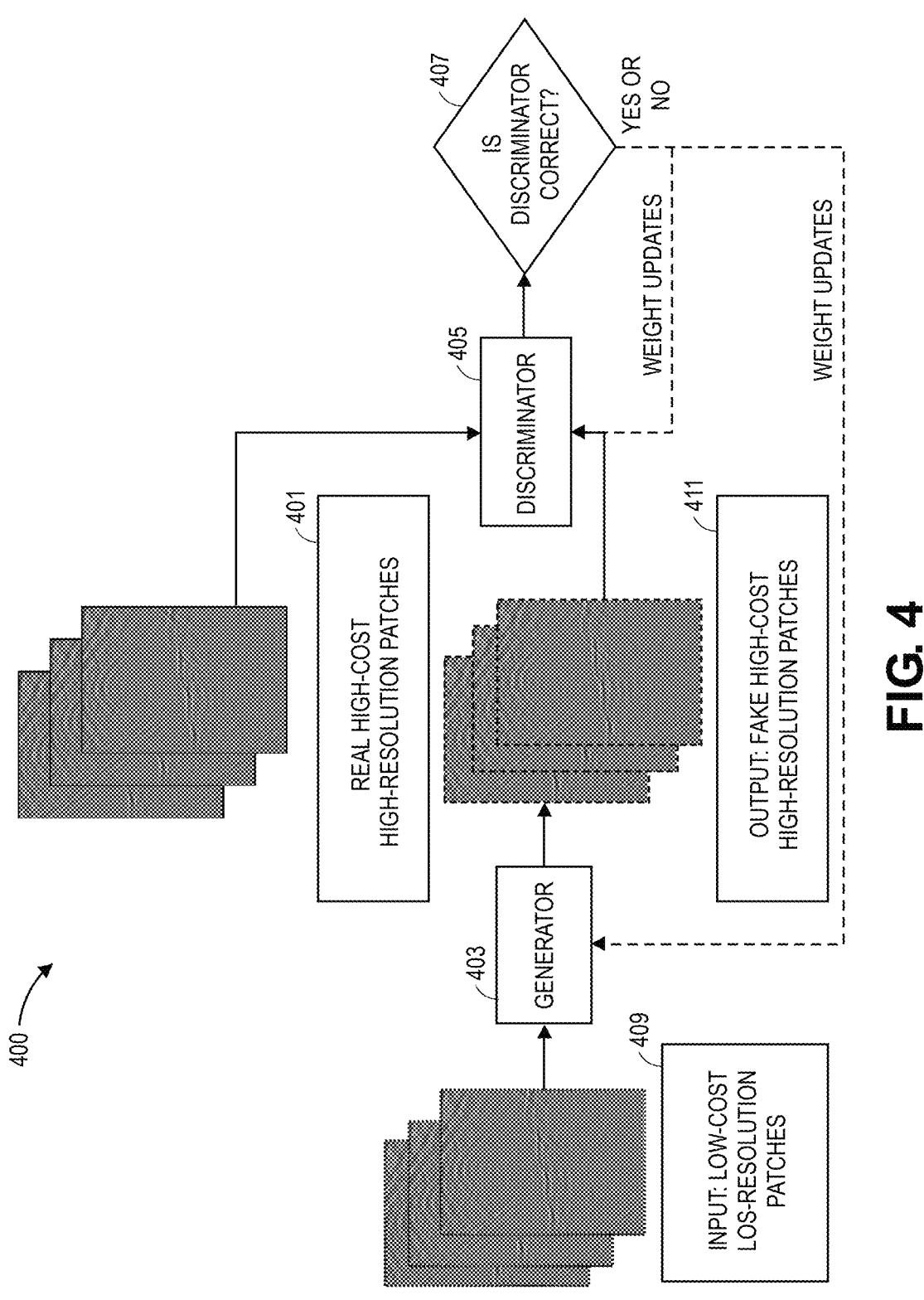
FIG. 4 illustrates a generator/discriminator workflow to map low-cost low-resolution images to high-cost high-resolution results, according to an embodiment.

Referring now to FIG. 4, a system 400 for continuously training a generator 403 and a discriminator 405 to produce high-quality results in a low-cost timeframe includes, but is not limited to including, a receiver 409 processing seismic data using a low-resolution, low-cost technique, and a generator 403 applying a trained machine learning model to the processed seismic data to produce high-resolution data. The receiver 409 executes fast-track processing techniques that complete in a relatively fast timeframe. The specific processing technique is chosen based on the seismic data, and can be automatically chosen, manually chosen, or a combination of automatic and manual methods. For example, the raw dataset could be supplied to the user, and the user could select a fast-track processing technique and a full-track processing technique. The category of technique, for example, interpolation, denoising, or recursive least squares, that is chosen for fast-track processing could be the same or different from the category that is chosen for full-track processing. Alternatively, the raw dataset could be evaluated automatically, and a processing technique appropriate for the raw dataset could be chosen automatically or suggested to a user as an option for selection.

Continuing to refer to FIG. 4, the generator 403 produces high-resolution data 411 and supplies those data to the discriminator 405. The system 400 also includes a receiver 401 processing seismic data using a high-resolution, high-cost technique, and supplying those data to the discriminator 405. The discriminator 405 determines 407 if the generated data and the high-cost data match. The results determined by the discriminator are fed back to the discriminator and the generator. If the generated and the high-cost data are within a threshold amount, the generator and the discriminator are rewarded, whereas the opposite is true if the generated and high-cost data differ by more than the threshold amount.

Figure 5:
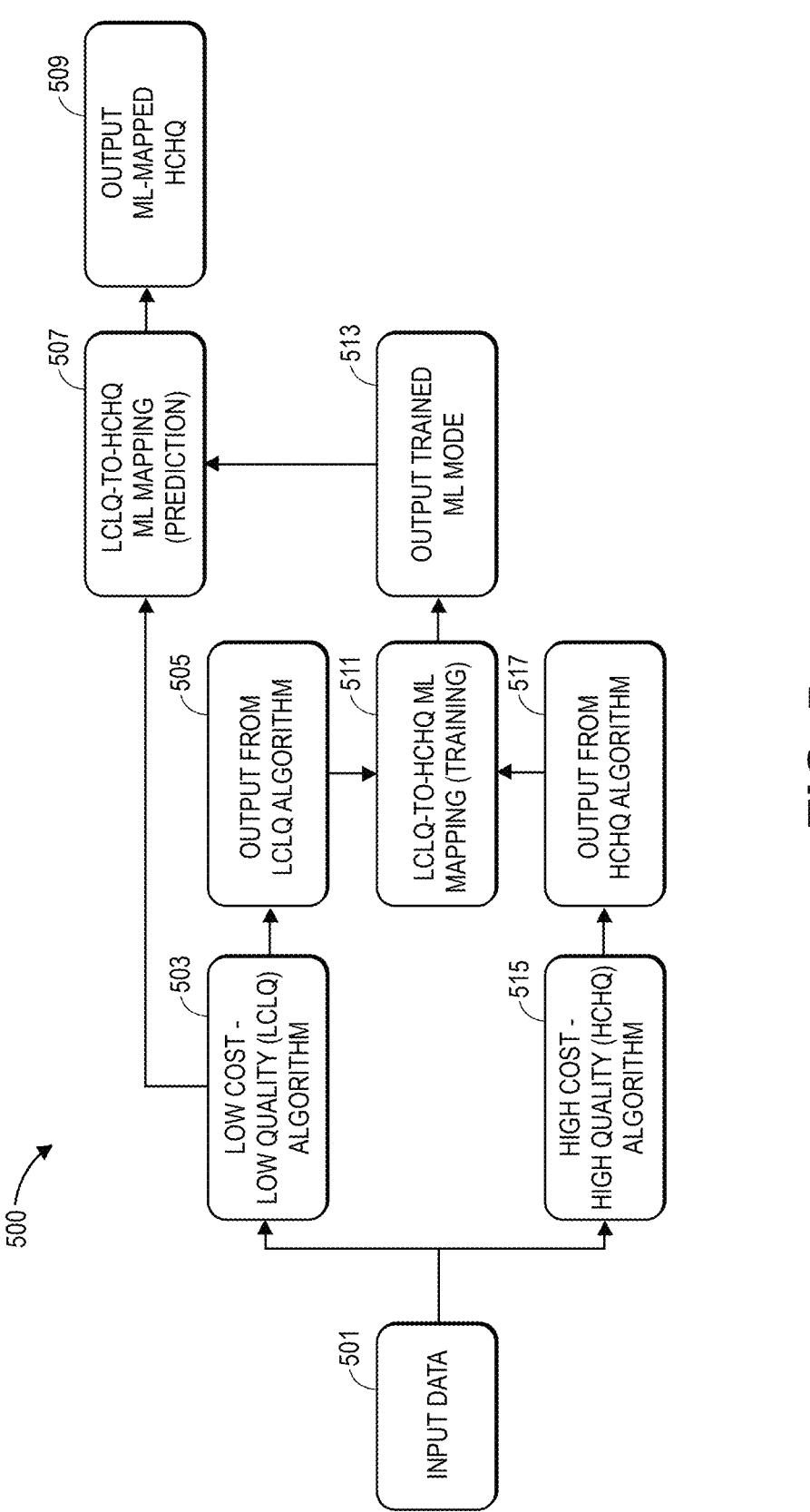
FIG. 5 illustrates a machine learning mapping workflow to map low-cost low-resolution images to high-cost high-resolution results, according to an embodiment.

Referring now to FIG. 5, an exemplary embodiment in accordance with the present disclosure includes system 500. In system 500, input data 501 are simultaneously processed by low-cost, low-quality processing techniques 503 and by high-cost, high-quality processing techniques 515. In an embodiment, the low-cost, low-quality processing technique 503 is frequency-domain matching pursuit Fourier interpolation (MPFI). In an embodiment, the low-cost, low-quality processing technique 503 is 3D multistage MPFI. In an embodiment, the high-cost, high-quality processing technique 515 is 3D sparse time-domain Radon interpolator (TDRI). In an embodiment, the high-cost, high-quality processing technique 515 is 3D multistage TDRI. The output 505 from the low-cost processing, which can be output from MPFI or 3D multistage MPFI, and the output 517 from the high-cost processing, which can be output from TDRI or 3D multistage TDRI, are provided to train 511 a machine learning model, which can be a MPFI-to-TDRI machine learning mapping. The low-cost, low-quality data (for example, MPFI or 3D multistage MPFI data) are provided to the trained machine learning model 513 to produce a prediction of high-cost, high-quality data 507 (for example, TDRI or 3D multistage TDRI data), that is used to produce the high-quality data 509. In an example, to compute 3D multistage data using the MPFI processing technique from sparsely sampled data requires 13 hours of CPU time, or three hours of elapsed time. To compute 3D multistage data using the TDRI processing technique requires 127,294 hours of CPU time, or 110 hours of elapsed time. In this example, a method for emulating multistage TDRI brings cost savings and quality improvements.

Figure 6:
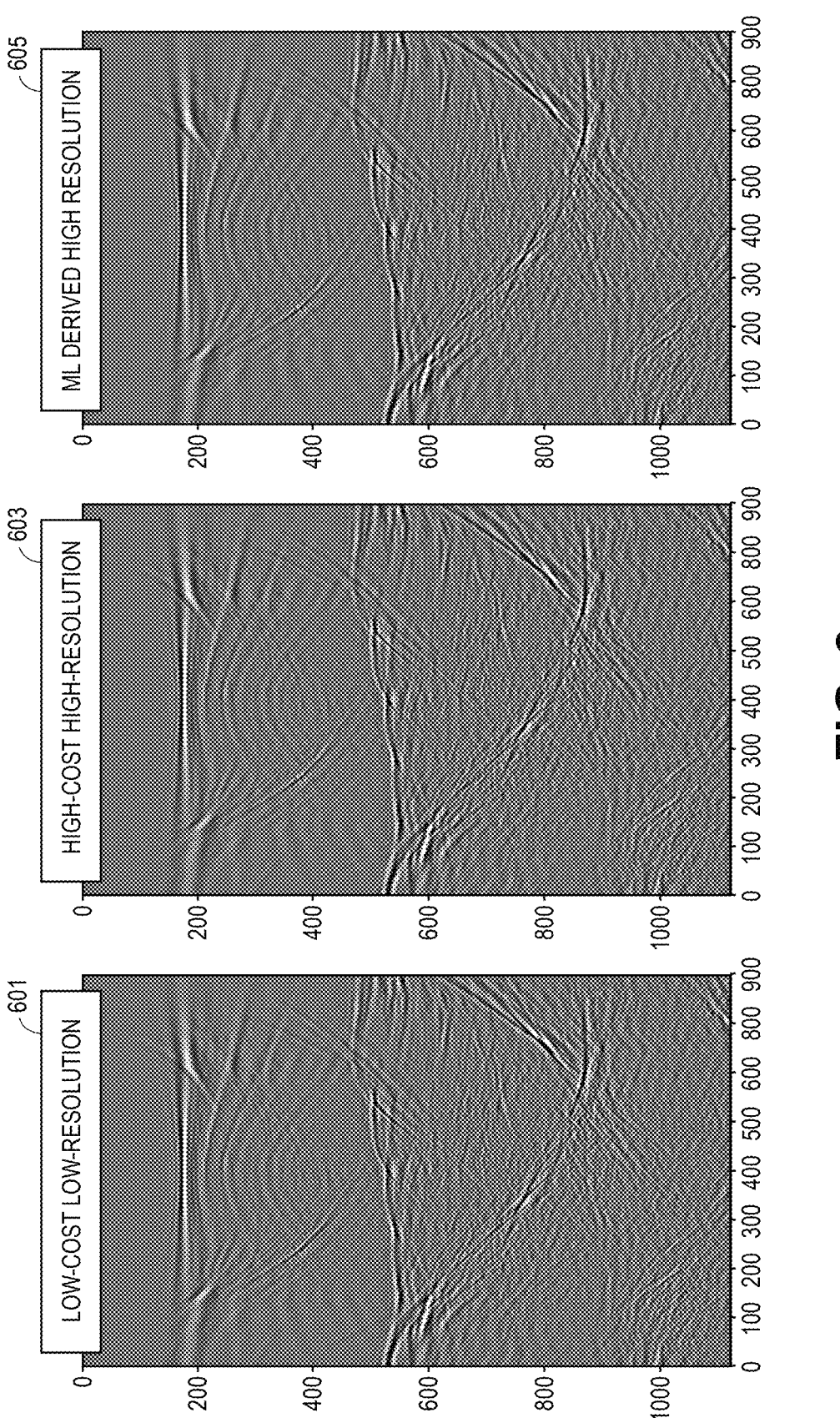
FIG. 6 illustrates a set of photographic illustrations showing the results of executing a method, according to an embodiment.

Referring now to FIG. 6, low-cost low-resolution interpolated data 601 can be used as input to a GAN. High-cost high-resolution dataset 603 is used as ground truth to the GAN. Machine learning-derived high-resolution dataset 605 is produced when the input dataset is low-cost low-resolution interpolated data 601, and where the GAN is trained as discussed herein.

FIG. 7 illustrates a flowchart of a method for generating high-quality seismic data, according to an embodiment. An illustrative order of the method 700 is provided below; however, one or more portions of the method 700 may be performed in a different order, simultaneously, repeated, or omitted. At least a portion of the method 700 may be performed with a computing system 900 (described below).

The method 700 may include receiving a first dataset, as at 705. The first dataset may be or include seismic data that represents a subsurface. The seismic data may be from a land or marine environment. The seismic data may be or include particle data. The particle data may be or include particle displacement data, particle velocity data, particle acceleration data, or a combination thereof.

The method 700 may also include selecting a first processing technique based at least upon the first dataset, as at 710. The first processing technique may be or include denoising, deblending, interpolating, deconvoluting, demultiple, deghosting, imaging, inversion, residual moveout correction (RMO), noise suppression, regularization, or a combination thereof.

The method 700 may also include producing first processed data from a sample of the first dataset using the first processing technique, as at 715. The first processed data may have a higher quality than the first dataset.

The method 700 may also include selecting a second processing technique based at least upon the first dataset, as at 720. The second processing technique may be or include denoising, deblending, interpolating, deconvoluting, demultiple, deghosting, imaging, inversion, RMO (residual moveout correction), noise suppression, regularization, or a combination thereof. The second processing technique may be different than the first processing technique.

The method 700 may also include producing second processed data from the sample using the second processing technique, as at 725. The second processed data may have a higher quality than the first dataset and/or the first processed data. In an embodiment, the first processing technique may be or include a first interpolation technique, the second processing technique may be or include a second interpolation technique, and the first interpolation technique is lower resolution than the second interpolation technique. For example, the first interpolation technique may be or include Fourier-based interpolation, and the second interpolation technique may be or include Radon-based interpolation.

The method 700 may also include training a machine learning model to transform the first processed data into the second processed data, as at 730. The machine learning model may be or include a generative adversarial network, a variational autoencoder, a diffusion model, a transformer, a neural radiance field, a convolution-based model, a non-convolution-based model, or a combination thereof. In an embodiment, the training may include or generate a generator loss function, a discriminator loss function, an adversarial loss function, a modified objective function, or a combination thereof.

In an example, the modified objective function can be written as:

$$\min_{G} \max_{D} V(D, G) = \mathbb{E}_{x \sim p_{data}(x)}[\log (D(x))] + \mathbb{E}_{x \sim p_z(z)}[\log (1 - D(G(z)))] +$$

$$\lambda_1 \|F(x) - F(G(z))\|_1 + \lambda_2 \|x - G(z)\|_1$$

Here:
1. $F(\bullet)$: Represents the Fourier Transform, mapping the data to the frequency domain.
2. $\|x\|_1$: The $\ell_1$ norm, which promotes sparsity and robustness to outliers.
3. $\lambda_1$, $\lambda_2$: Weighting parameters for the norm $\ell_1$ norm regularization terms.

Explanation of Terms

Standard GAN Objective V(D,G): The adversarial loss component ensures the generator produces data that matches the overall distribution of real data.

Frequency-Domain Misfit $\lambda_1\|F(x)-F(G(z))\|_1$: Enforces similarity between the real and generated data in the frequency domain, capturing structural differences that might not be apparent in the time or spatial domain.

Data-Domain Misfit $\lambda_2\|x-G(z)\|_1$: Ensures the generated samples closely resemble the real data in the original domain, adding robustness to noise and outliers.

This hybrid loss function encourages the generator to produce samples that align with the real data both statistically and structurally, leading to improved robustness in challenging data scenarios.

The method 700 may also include receiving a second dataset, as at 735. The second dataset may be or include seismic data that represents a subsurface. The seismic data may be from a land or marine environment. The seismic data may be or include particle data. The particle data may be or include particle displacement data, particle velocity data, particle acceleration data, or a combination thereof.

The method 700 may also include transforming the second dataset into a third dataset using the trained machine learning network, as at 740. The third dataset may have a higher quality than the first dataset, the first processed data, the second dataset, or a combination thereof.

The method 700 may also include displaying the third dataset, as at 745.

The method 700 may also include creating a model of the subsurface based upon the third dataset, as at 750.

The method 700 may also include performing a wellsite action based upon the third dataset, as at 755. The wellsite action may be or include generating and/or transmitting a signal (e.g., using a computing system) that instructs or causes a physical action to occur at a wellsite. The wellsite action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, or the like.

Figure 8:
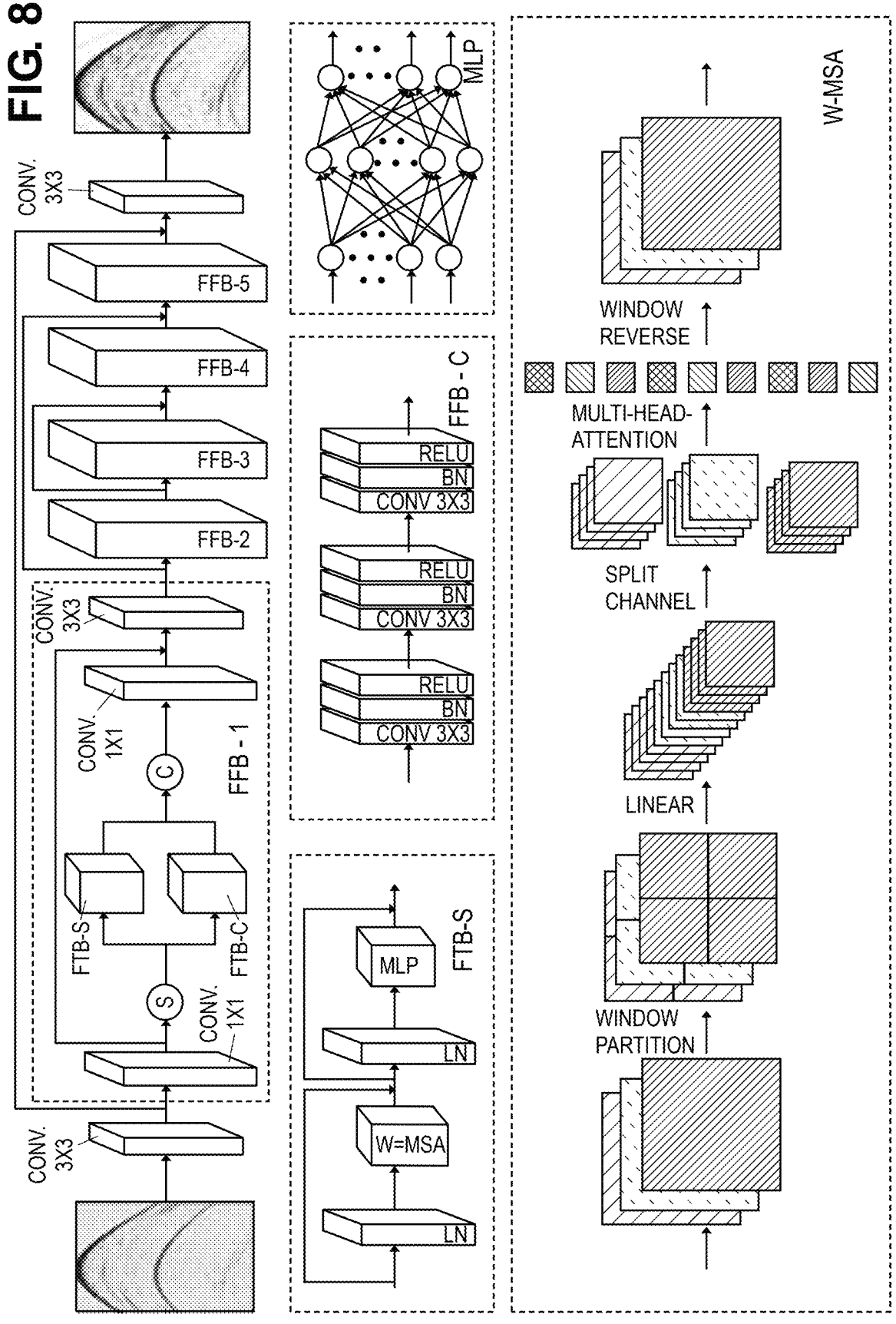
FIG. 8 illustrates a schematic view of Swin transformer convolution residual networks, according to an embodiment.

FIG. 8 illustrates a schematic view of Swin transformer convolution residual networks, according to an embodiment. In some embodiments, instead of using UNet in GAN, another architecture that can be utilized in GAN is known as a Swin transformer, which can capture the global context through attention mechanisms and capture the local context through the use of convolutional neural network, offering a compelling alternative to UNet's. While UNet excels in preserving fine-grained spatial relationships within fixed-size input images, Swin Transformers may bring notable advantages, particularly in scenarios where understanding long-range dependencies across the entire image is paramount. Further, UNet uses a pooling function, which may lose spatial resolution as it goes deeper in the network architecture, whereas the flexibility of Swin transformers in handling variable-length sequences without padding can be leveraged to accommodate diverse input sizes efficiently. As a result, in an embodiment, the generator architecture in GAN, which normally uses UNet, may be replaced with a Swin transformer.

The vision transformer may help to stabilize learning using GAN architecture. The vision transformer may be included as part of the GAN architecture itself. In the past, people have used GAN architecture alone for seismic without realizing the benefits of including vision transformer. The method described herein combines the vision transformer inside the GAN while minimizing the GAN objective function and data terms in both data space and transform domain such as a Fourier transform.

Figure 9:
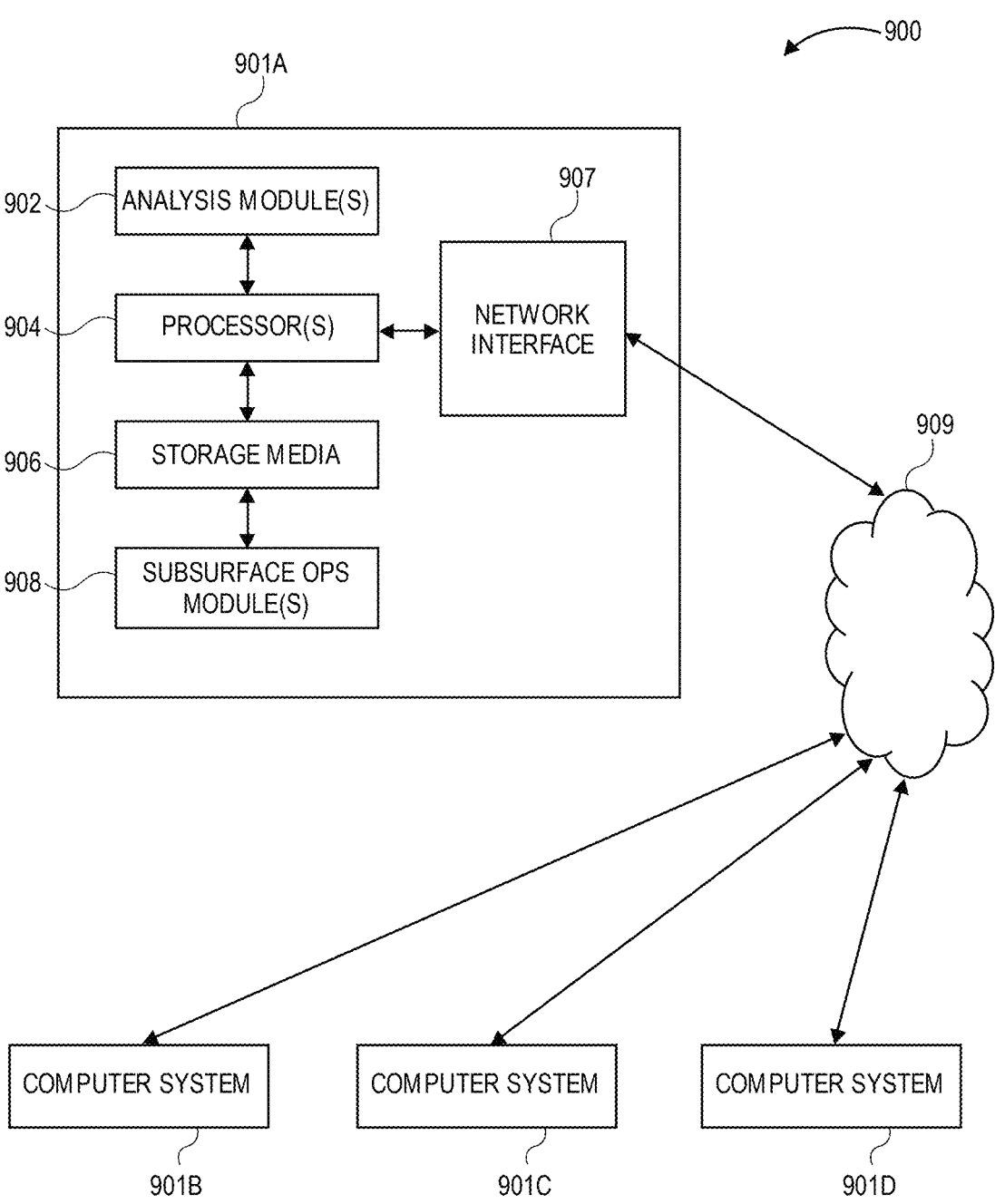
FIG. 9 illustrates a schematic view of a computing system, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more data reception and processing modules 902 that are configured to perform various tasks according to some embodiments, such as one or more methods disclosed herein. To perform these various tasks, the data reception and processing module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EE- PROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 900 contains one or more seismic data module(s) 908. In the example of computing system 900, computer system 901A includes the seismic data module 908. In some embodiments, a single subsurface operations module may be used to perform some aspects of one or more embodiments of the methods disclosed herein. In other embodiments, a plurality of subsurface operations modules may be used to perform some aspects of methods herein.

It should be appreciated that computing system 900 is merely one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

The invention claimed is:

1. A method for generating high-quality seismic data, the method comprising:
    receiving a first dataset;
    selecting a first processing technique based upon the first dataset;
    producing first processed data from the first dataset using the first processing technique;
    selecting a second processing technique based upon the first dataset, wherein the second processing technique is different than the first processing technique;
    producing second processed data from the first dataset using the second processing technique;
    training a machine learning model to transform the first processed data into the second processed data;
    receiving a second dataset;
    transforming the second dataset into a third dataset using the trained machine learning model; and
    performing a wellsite action based upon the third dataset, wherein:
        the wellsite action comprises at least one of generating or transmitting a signal that instructs or causes a physical action to occur at a wellsite, and
        the physical action comprises:
            selecting where to drill a wellbore;
            drilling the wellbore;
            varying at least one of a weight or a torque on a drill bit that is drilling the wellbore;
            varying a drilling trajectory of the wellbore;
            varying at least one of a concentration or a flow rate of a fluid pumped into the wellbore; or
            a combination thereof.

2. The method of claim 1, wherein the first dataset comprises seismic data that represents a subsurface.

3. The method of claim 1, wherein the first processed data has a higher quality than the first dataset.

4. The method of claim 1, wherein the second processed data has a higher quality than the first dataset and the first processed data.

5. The method of claim 1, wherein the third dataset has a higher quality than the second dataset.

6. The method of claim 1, further comprising displaying the third dataset.

7. The method of claim 1, further comprising creating or updating a model of a subsurface based upon the third dataset.

8. A computing system for generating high-quality seismic data from low-quality seismic data, the computing system comprising:
    one or more processors; and
    a memory system including one or more non-transitory computer-readable media storing instructions that, when executed by at least one of the one or more processors, cause the computing system to perform operations, the operations including:
        receiving a first dataset, wherein the first dataset comprises seismic data that represents a subsurface;
        selecting a first processing technique based upon the first dataset;
        producing first processed data from the first dataset using the first processing technique, wherein the first processed data has a higher quality than the first dataset;

selecting a second processing technique based upon the first dataset, wherein the second processing technique is different than the first processing technique;

producing second processed data from the first dataset using the second processing technique, wherein the second processed data has a higher quality than the first dataset and the first processed data;

training a machine learning model to transform the first processed data into the second processed data;

receiving a second dataset;

transforming the second dataset into a third dataset using the trained machine learning model, wherein the third dataset has a higher quality than the first dataset and the second dataset; and performing a wellsite action based upon the third dataset, wherein:

the wellsite action comprises at least one of generating or transmitting a signal that instructs or causes a physical action to occur at a wellsite, and the physical action comprises:

selecting where to drill a wellbore;

drilling the wellbore;

varying at least one of a weight or a torque on a drill bit that is drilling the wellbore;

varying a drilling trajectory of the wellbore;

varying a concentration and/or flow rate of a fluid pumped into the wellbore; or a combination thereof.

9. The computing system of claim 8, wherein the seismic data comprises particle data, and wherein the particle data comprises particle displacement data, particle velocity data, particle acceleration data, or a combination thereof.

10. The computing system of claim 8, wherein the first and second processing techniques comprise denoising, deblending, interpolating, deconvoluting, demultiple, deghosting, imaging, inversion, residual moveout correction (RMO), noise suppression, regularization, or a combination thereof.

11. The computing system of claim 8, wherein the machine learning model comprises a generative adversarial network, a variational autoencoder, a diffusion model, a transformer, a neural radiance field, a convolution-based model, a non-convolution-based model, or a combination thereof.

12. The computing system of claim 8, wherein training comprises a generator loss function, a discriminator loss function, an adversarial loss function, or a combination thereof.

13. A non-transitory computer-readable medium storing instructions for autonomously performing a subsurface operation that, when executed by one or more processors of a computing system, cause the computing system to perform operations, the operations comprising:

receiving a first dataset, wherein the first dataset comprises seismic data that represents a subsurface, wherein the seismic data is from a land or marine environment, wherein the seismic data comprises particle data, and wherein the particle data comprises particle displacement data, particle velocity data, particle acceleration data, or a combination thereof;

selecting a first processing technique based upon the first dataset, wherein the first processing technique comprises denoising, deblending, interpolating, deconvoluting, demultiple, deghosting, imaging, inversion, residual moveout correction (RMO), noise suppression, regularization, or a combination thereof;

producing first processed data from the first dataset using the first processing technique, wherein the first processed data has a higher quality than the first dataset;

selecting a second processing technique based upon the first dataset, wherein the second processing technique comprises denoising, deblending, interpolating, deconvoluting, demultiple, deghosting, imaging, inversion, RMO, noise suppression, regularization, or a combination thereof, and wherein the second processing technique is different than the first processing technique;

producing second processed data from the first dataset using the second processing technique, wherein the second processed data has a higher quality than the first dataset and the first processed data;

training a machine learning model to transform the first processed data into the second processed data, wherein the machine learning model comprises a generative adversarial network, a variational autoencoder, a diffusion model, a transformer, a neural radiance field, a convolution-based model, a non-convolution-based model, or a combination thereof, and wherein training comprises or generates a generator loss function, a discriminator loss function, an adversarial loss function, a modified objective function, or a combination thereof;

receiving a second dataset;

transforming the second dataset into a third dataset using the trained machine learning model, wherein the third dataset has a higher quality than the first dataset and the second dataset;

displaying the third dataset; and performing a wellsite action based upon the third dataset, wherein:

the wellsite action comprises at least one of generating or transmitting a signal that instructs or causes a physical action to occur at a wellsite, and the physical action comprises:

selecting where to drill a wellbore;

drilling the wellbore;

varying at least one of a weight or a torque on a drill bit that is drilling the wellbore;

varying a drilling trajectory of the wellbore;

varying at least one of a concentration or a flow rate of a fluid pumped into the wellbore; or a combination thereof.

14. The non-transitory computer-readable medium of claim 13, wherein the first processing technique comprises a first interpolation technique, wherein the second processing technique comprises a second interpolation technique, and wherein the first interpolation technique is lower resolution than the second interpolation technique.

15. The non-transitory computer-readable medium of claim 14, wherein the first interpolation technique comprises Fourier-based interpolation, and wherein the second interpolation technique comprises Radon-based interpolation.

16. The non-transitory computer-readable medium of claim 13, wherein the operations further comprise creating or updating a model of the subsurface based upon the third dataset.

17. The non-transitory computer-readable medium of claim 13, wherein the operations further comprise performing a wellsite action based upon the third dataset, and wherein the wellsite action comprises generating and/or transmitting a signal that instructs or causes a physical action to occur at a wellsite.

18. The non-transitory computer-readable medium of claim 13, wherein the training comprises or generates the modified objective function, and wherein the modified objective function is based upon:

a Fourier transform that maps at least one of the first dataset or the second dataset from an original domain to a frequency domain;

an L1 norm for outliers of the first dataset and the second dataset in the frequency domain; and first and second weighting parameters for the L1 norm.

19. The non-transitory computer-readable medium of claim 18, wherein the modified objective function further comprises an adversarial loss component that ensures that a generator produces generated data that matches an overall distribution of real data.

20. The non-transitory computer-readable medium of claim 19, wherein the modified objective function further comprises:

a frequency-domain misfit function that enforces similarity between the real data and the generated data in the frequency domain, thereby capturing structural differences that are not apparent in a time and a spatial domain; and a data-domain misfit function that ensures that samples of the generated data resemble the real data in the original domain, thereby adding robustness to the outliers and to noise.

\* \* \* \* \*